United States Patent [19]
Saiz

[11] Patent Number: 6,053,453
[45] Date of Patent: Apr. 25, 2000

[54] AIRCRAFT AND HIGH SPEED VEHICLES

[76] Inventor: Manuel Munoz Saiz, San Emilio 16,1,3, Madrid, Spain, 28017

[21] Appl. No.: 09/127,476

[22] Filed: Jul. 31, 1998

Related U.S. Application Data

[63] Continuation-in-part of application No. 09/095,957, May 4, 1998.

[30] Foreign Application Priority Data

Sep. 6, 1996 [ES] Spain ...................................... 9601904
Aug. 7, 1997 [ES] Spain ...................................... 9701753

[51] Int. Cl.[7] ...................................................... B64C 1/00
[52] U.S. Cl. ............................................................. 244/36
[58] Field of Search ................................ 244/34 R, 35 A, 244/35 R, 36, 119, 130

[56] References Cited

U.S. PATENT DOCUMENTS

5,711,494  1/1998  Saiz ........................................ 244/12.1

*Primary Examiner*—Peter M. Poon
*Assistant Examiner*—Charles R. Ducker, Jr.
*Attorney, Agent, or Firm*—Robert M. Schwartz

[57] ABSTRACT

The improvement to aircraft or high-speed vehicles in this invention comprises an elongated uniform fuselage with a flattened rectangular, oval or circular transverse cross-section, to take a form whose side view is a rhomboid with the longer sides horizontal and in which the inclined flat frontal surface is a ramp beginning in front at the top, dropping along and inclined backward until meeting the base, the inclined surface of the tail is parallel to the front surface, that is, with the rear surface beginning at the top, dropping along and inclined backward until meeting the base having the unions between the other, non-lateral surfaces suitable rounded.

10 Claims, 2 Drawing Sheets

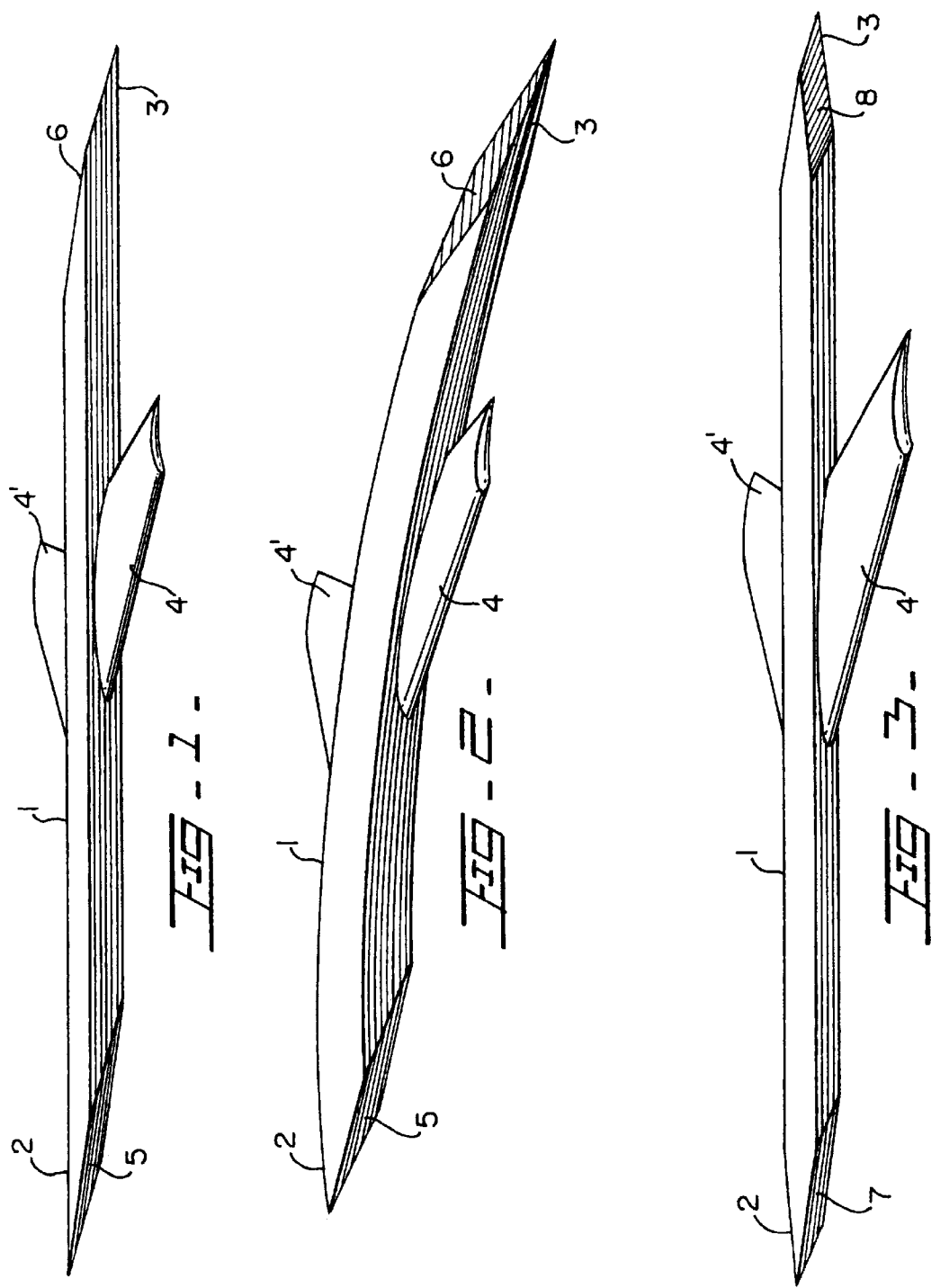

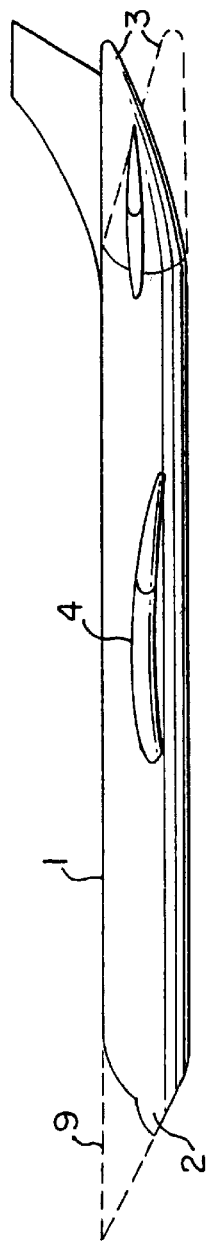
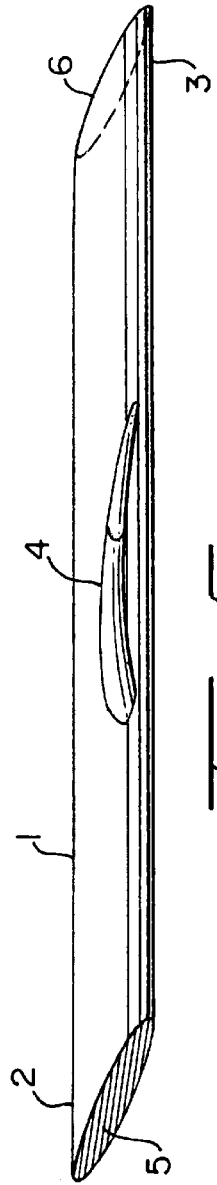
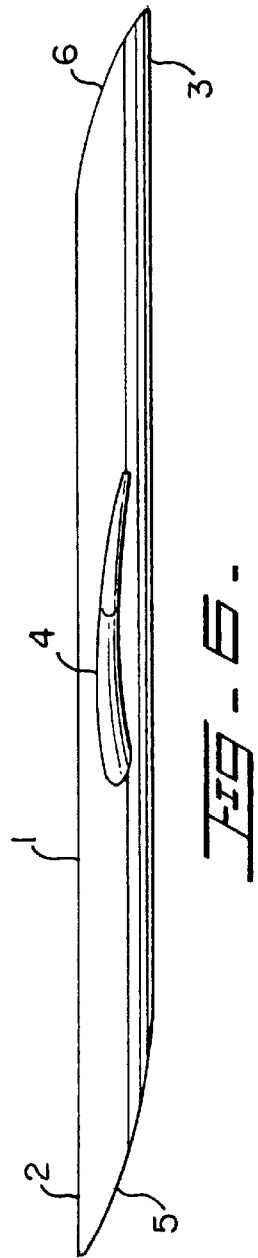

AIRCRAFT AND HIGH SPEED VEHICLES

CROSS-REFERENCES TO RELATED APPLICATIONS

This is a continuation-in-part of application Ser. No. 09/095,957 filed on May 4, 1998.

This application claims the priority date of the following Spanish patent applications: P9601904 filed Sep. 6, 1996 and P9701753 filed Aug. 7, 1997. The basis for priority in this case is the Paris Convention for the Protection of Industrial Property (613 O.G. 23, 53 Stat 1748). The Spanish patent application was filed in the Official Patent and Trademark Office in Spain.

BACKGROUND OF THE INVENTION

1. Field of the Invention

The Field of the invention is high speed vehicle fuselages.

2. Description of the Prior Art

Existing high-speed vehicle fuselages have a front and rear layout which in some cases is conical or similarly shaped to deflect the air radially. In other cases, the shapes of the fuselages pressure the vehicle into the ground without taking advantage of the slipstream energy.

SUMMARY OF THE INVENTION

The improvement to aircraft and high-speed vehicles in this invention comprises a novel fuselage. The fuselage is an elongated uniform fuselage with a flattened rectangular, oval, or circular transverse cross-section, to take a form whose side view is a rhomboid. This rhomboid has longer horizontal sides, and an inclined flat frontal surface that is a ramp beginning in front at the top, dropping along and inclined backward until meeting the base. The inclined surface of the tail is parallel to the front surface; that is, with the rear surface beginning at the tip, dropping along and inclined backward until meeting the base. The unions between the other, non-lateral, surfaces are suitably rounded.

The fuselage can in any case be slightly curved, convex, lengthwise-and-upward to take a wing-like profile. This fuselage's lift is particularly on the flattened rectangular transverse section.

The nose of the rectangular fuselage may have two swept-back sides which slope backward and downward to the central longitudinal vertical plane. This shape is similar to the prow of a boat. This design is reversed for the tail.

The landing gear may be set backward, or the tail may be tiltable to allow rotation during take-off and landing. Otherwise, for these maneuvers, nose-up inclination is reduced. Slots or means to blow or suck in can be used to protect the boundary layer. For this, the nose may be also tiltable.

Those systems may be applied separately to the nose or tail, in which case the corrections required with the stabilizer are greater.

The tendency for the fuselage to take a direction in relation to the flight air current is corrected with the stabilizer. This correction is in the same way as its is corrected at present. The wings tend to take a direction at a zero angle of minimum resistance to advance in relation to the air current.

The system in the invention is not the be found in fish, or water drops, since no energy is used in the creation of the lift, which is required in aircraft and birds, though not in dirigibles.

The best efficiency of this system is achieved with the vehicles shown in FIGS. 1, 2, and 5.

BRIEF DESCRIPTION OF THE DRAWINGS

FIG. 1 is a perspective, diagramed side view of an aircraft.

FIG. 2 is a perspective, diagramed side view of an aircraft.

FIG. 3 is a perspective, diagramed side view of an aircraft.

FIG. 4 is a perspective, diagramed side view of an aircraft.

FIG. 5 is a perspective, diagramed side view of an aircraft.

FIG. 6 is a perspective, diagramed side view of an aircraft.

DETAILED DESCRIPTION OF THE PREFERRED EMBODIMENTS

FIG. 1 comprises the fuselage 1, the nose 2, the tail 3, the wings 4 and 4', the inclined frontal surfaces 5, and the inclined rear surface 6.

FIG. 2 comprises the fuselage 1, the nose 2, the tail 3, the wings 4 and 4', the inclined frontal surface 5 and the inclined rear surface 6.

FIG. 3 comprises the fuselage 1, the nose 2, the tail 3, the wings 4 and 4', the inclined lateral and frontal surface 7, and the inclined lateral and rear surface 8.

FIG. 4 comprises the fuselage 1, the nose 2, the tiltable tail 3, the wing 4, and the tiltable or added modified nose 9.

FIG. 5 comprises the fuselage 1, the nose 2, the tiltable tail 3, the wing 4, the inclined frontal surface 5, and the inclined rear surface 6.

FIG. 6 comprises the fuselage 1, the nose 2, the tail 3, the wing 4, the inclined frontal and slightly convex surface 5, and the rear inclined and slight convex surface 6.

The unions between the inclined frontal surface and the lower surface of the fuselage and the inclined rear surface and the upper surface of the fuselage can in any case be suitably rounded.

Some drawings do no show the stabilizer and the fin unit.

I claim:

1. An improvement for high speed vehicles comprising an elongated fuselage with a flattened and uniformly transverse cross-section, to take a form whose side view is a rhomboid with the longer sides being horizontal and in which the inclined flat frontal surface is a ramp beginning in front at the top, dropping along and inclined backwards until meeting the base, the inclined surface of the tail is parallel to the front surface, that is, with the rear surface beginning at the top, dropping along and inclined backward until meeting the base, having the unions between the other non-lateral surfaces suitably rounded.

2. An improvement as described in claim 1, wherein said fuselage has a flattened rectangular transverse cross-section.

3. An improvements as described in claim 1, wherein said fuselage has an oval transverse cross-section.

4. An improvement as described in claim 1, wherein said fuselage has a circular transverse cross-section.

5. An improvement as described in claim 1, wherein said fuselage is slightly curved, convex, lengthwise and upward to take a wing-like profile.

6. An improvement as described in claim 1, wherein said fuselage has two swept-back sides which slope backward and downward to the central longitudinal vertical plane, like the prow of a boat, this design is reversed for the tail.

7. An improvement as described in claim 1, wherein said tail is tiltable.

8. An improvement as described in claim 1, wherein said inclined flat surface is used only to the nose.

9. An improvement as described in claim 1, wherein said vehicle is an airplane.

10. An improvement as described in claim 1, wherein the front of said fuselage has two swept-back sides which, from said front, slope backward and downward to the central longitudinal vertical plane.

* * * * *